H. R. ROBBINS.
Sad-Iron.

No. 168,050.

Patented Sept. 21, 1875.

WITNESSES:
W. W. Hollingsworth
John C. Kenon

INVENTOR:
H. R. Robbins
BY
ATTORNEYS.

UNITED STATES PATENT OFFICE.

HENRY R. ROBBINS, OF BALTIMORE, MARYLAND.

IMPROVEMENT IN SAD-IRONS.

Specification forming part of Letters Patent No. 168,050, dated September 21, 1875; application filed August 16, 1875.

*To all whom it may concern:*

Be it known that I, HENRY R. ROBBINS, of Baltimore city, State of Maryland, have invented a new and Improved Sad-Iron; and I do hereby declare that the following is a full, clear, and exact description of the same, reference being had to the accompanying drawing, forming a part of this specification, in which—

Figure 1:
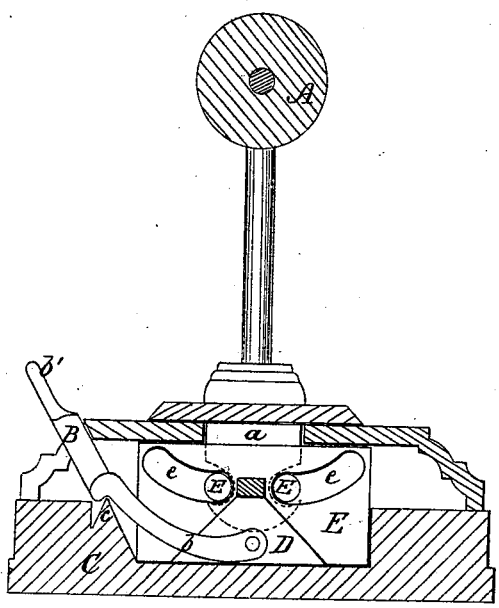
Figure 2:
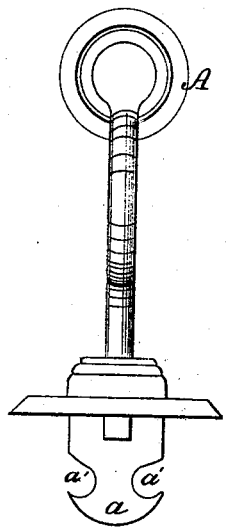
Figure 3:
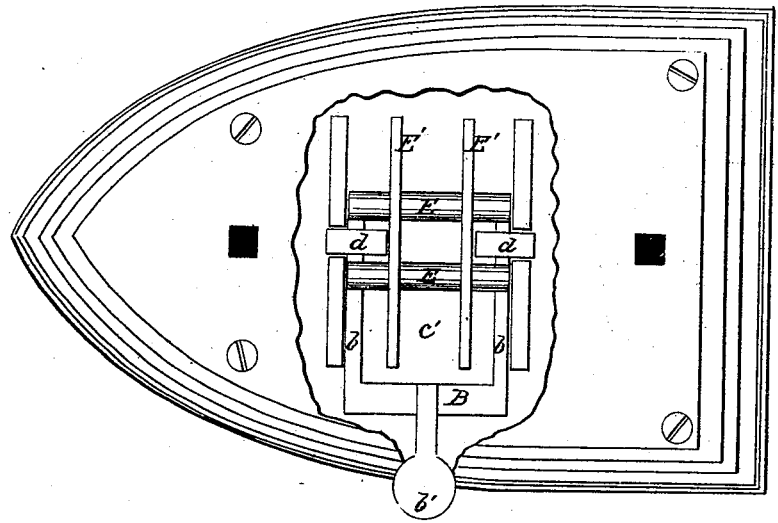

Figure 1 is a transverse vertical section; Fig. 2, a detail view in elevation; Fig. 3, a plan view, part being broken away.

The invention relates to novel means whereby the handle of a sad-iron may be quickly locked or unlocked, engaged with or detached from, the body, all as hereinafter described with drawing, and subsequently pointed out in claims.

A represents the handle, having a bottom plate, beneath which is formed the pendent wedge $a$, and the opposite cavities $a'$ $a'$, thereabove. B is a loose bifurcated lever, that turns upon a rib, $c$, of the body C, and works in a cavity, $c'$, thereof. Over and on the prongs $b$ $b$ rest the arms $d$ of loose, upwardly-pointed wedges D. E are loose rollers, working in the oblique slots $e$ $e$ of the bearing-plates $E'$ $E'$.

By pressing down upon the handle $b'$ of lever B the wedges D are thrown up, so as to drive the rollers E E apart, up the oblique slots $e$ $e$, and allow the handle-wedge $a$ to be removed or inserted. The lever being now allowed to fall by the weight of its prong ends, the rollers come down into the cavities $a'$ $a'$, and prevent its egress.

The handle may thus be applied quickly whenever the operator is ready to use the iron, and may be removed with equal facility at other times.

Having thus described my invention, what I claim as new is—

1. The combination, in a sad-iron, of the handle-wedge $a$, having side concavities $a'$ $a'$ thereabove, with rollers E E that are moved up and down in oblique slots of bearings, to lock and unlock the handle, as described.

2. The combination, with loose rollers E E, of the upwardly-pointed wedges D D, having arms $d$, and the bifurcated hand-lever B, to move said rollers at the time and in the manner specified.

HENRY R. ROBBINS.

Witnesses:
 GEO. S. HEMMICK,
 GASSAWAY WATKINS.